(12) United States Patent
Girod et al.

(10) Patent No.: US 10,524,094 B2
(45) Date of Patent: Dec. 31, 2019

(54) COMMUNICATION SYSTEM, AIRCRAFT/SPACECRAFT AND COMMUNICATION METHOD

(71) Applicant: Airbus Operations GmbH, Hamburg (DE)

(72) Inventors: Maurice Girod, Hamburg (DE); Uwe Bartels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/895,602

(22) Filed: Feb. 13, 2018

(65) Prior Publication Data
US 2018/0234803 A1 Aug. 16, 2018

(30) Foreign Application Priority Data
Feb. 16, 2017 (DE) .......... 10 2017 202 499

(51) Int. Cl.
*H04B 7/185* (2006.01)
*H04W 4/029* (2018.01)
(Continued)

(52) U.S. Cl.
CPC ............ *H04W 4/029* (2018.02); *B64D 45/00* (2013.01); *B64G 1/52* (2013.01); *G07C 5/008* (2013.01); *G08G 5/0004* (2013.01); *H04B 7/18508* (2013.01); *H04B 7/18515* (2013.01); *H04B 7/19* (2013.01); *B64D 2045/0065* (2013.01); *G07C 5/0841* (2013.01)

(58) Field of Classification Search
CPC ... H04W 4/029; H04B 7/18508; H04B 7/185; H04B 7/18515; H04B 7/19; G08G 5/0004; B64D 45/00; B64G 1/52; G07C 5/00
See application file for complete search history.

(56) References Cited

U.S. PATENT DOCUMENTS 6,571,102 B1 5/2003 Hogberg et al.
2009/0096857 A1* 4/2009 Frisco ............... H04B 7/18508
348/14.02

(Continued)

FOREIGN PATENT DOCUMENTS

EP 3135589 A1 3/2017
WO WO 2013/088275 A1 6/2013

OTHER PUBLICATIONS

German Search Report for German Application No. 102017202499.2 dated Aug. 4, 2017.
(Continued)

*Primary Examiner* — Thanh C Le
(74) *Attorney, Agent, or Firm* — Jenkins, Wilson, Taylor & Hunt, P.A.

(57) ABSTRACT

A communication system for satellite-based communication for an aircraft/spacecraft with data memory, which is configured to store aircraft/spacecraft data during operation of the aircraft/spacecraft, a communication device, which is configured to communicate with at least one satellite-based communication system, and a control device, which is coupled to the data memory and the communication device and is configured to output aircraft/spacecraft data stored in the data memory during operation of the aircraft/spacecraft via the communication device.

12 Claims, 4 Drawing Sheets

(51) Int. Cl.
*B64D 45/00* (2006.01)
*B64G 1/52* (2006.01)
*G07C 5/00* (2006.01)
*G08G 5/00* (2006.01)
*H04B 7/19* (2006.01)
*G07C 5/08* (2006.01)

(56) References Cited

U.S. PATENT DOCUMENTS

| | | |
|---|---|---|
| 2013/0158751 A1 | 6/2013 | Cornell et al. |
| 2014/0013002 A1 | 1/2014 | Holstein et al. |
| 2015/0318913 A1* | 11/2015 | Lauer ................ H04B 7/18506 455/431 |
| 2015/0380802 A1* | 12/2015 | Newkirk ............ H04B 7/18515 343/879 |
| 2017/0063944 A1* | 3/2017 | Nyikos ............... H04L 65/4069 |

OTHER PUBLICATIONS

German Search Report for German Application No. 102017202494.1 dated Aug. 4, 2017.

\* cited by examiner

COMMUNICATION SYSTEM, AIRCRAFT/SPACECRAFT AND COMMUNICATION METHOD

CROSS-REFERENCE TO RELATED APPLICATION

This application claims priority to German Patent Application DE 10 2017 202 499.2, filed on Feb. 16, 2017, the entire disclosure of which is incorporated by reference herein.

TECHNICAL FIELD

The present disclosure relates to a communication system, an aircraft/spacecraft and a communication method.

BACKGROUND

Nowadays, aircraft/spacecraft usually provide the possibility of storing data on the aircraft/spacecraft during flight. Data of this kind are used for evaluation and for root cause analysis, e.g. after an incident.

Flight data recorders, which store data during the flight, are usually used in aircraft/spacecraft for this purpose. Following an incident, the flight data recorders are located and recovered. Following recovery, the stored data can be extracted and analyzed.

In order to locate the flight data recorders, the flight data recorders conventionally comprise a locating aid, known as an underwater locator beacon, which emits an acoustic signal having a frequency of approximately 37.5 kHz, which signal can be located using sonar-based techniques. The detection range for an acoustic signal of this kind is 4000 m.

In order to improve the process of locating a flight data recorder of this kind, locating aids that emit an acoustic signal having a frequency of approximately 8.8 kHz can also be used in modern flight data recorders. The acoustic signals having a frequency of 8.8 kHz can be located over a distance of approximately 13 km.

A possible locating aid is disclosed e.g. in WO 2013 088 275 A1.

The particular locating aid and thus also the aircraft/spacecraft can be located and recovered during an incident at sea, for example using recovery ships, which attempt to detect and pinpoint the acoustic signal of the locating aids.

SUMMARY

Against this background, it is an idea of the present disclosure to make simplified detection of flight data possible.

A communication system for satellite-based communication for an aircraft/spacecraft is provided accordingly. The communication system comprises a data memory, which is designed or configured to store aircraft/spacecraft data during operation of the aircraft/spacecraft, a communication device, which is designed or configured to communicate with at least one satellite-based communication system, and a control device, which is coupled to the data memory and the communication device and is designed or configured to output aircraft/spacecraft data stored in the data memory during operation of the aircraft/spacecraft via the communication device.

Furthermore, an aircraft/spacecraft is provided which comprises a communication system according to the disclosure herein. An aircraft/spacecraft can be understood to mean any type of aircraft/spacecraft.

Finally, a communication method for satellite-based communication for an aircraft/spacecraft is provided. The communication method comprises storing aircraft/spacecraft data during operation of the aircraft/spacecraft, communicating with at least one satellite-based communication system, and outputting the stored aircraft/spacecraft data during operation of the aircraft/spacecraft via communication with the at least one satellite-based communication system.

The present disclosure is based on the knowledge that aircraft/spacecraft data can be evaluated very easily if the data have already been output to a central data management system, for example, during operation of the aircraft/spacecraft.

The present disclosure uses this knowledge and provides a system in an aircraft/spacecraft which stores the aircraft/spacecraft data and can already output the data in a satellite-based manner during operation of the aircraft/spacecraft. In this case, the aircraft/spacecraft data may for example be the data which are conventionally stored on a flight data recorder. Data of this kind may therefore comprise, for example, flight data, such as the position and orientation of the aircraft/spacecraft, audio data from the cockpit or the cabin of the aircraft/spacecraft, image data from the cockpit or cabin of the aircraft/spacecraft, or the like.

The present disclosure thus supplements conventional flight data recorders, for example, in that the aircraft/spacecraft data can already be output before and/or during an incident. If all the flight data have already been output during the incident, it may even be possible to dispense with the recovery of the flight data recorder.

According to a development, the communication device may comprise a first antenna array, which is designed or configured to transmit data to a first satellite-based communication system comprising geostationary satellites. Furthermore, the control device may be designed or configured to output the aircraft/spacecraft data via the first satellite-based communication system during normal operation of the aircraft/spacecraft and when data communication via the first satellite-based communication system is fully available.

In satellite-based communication systems comprising geostationary satellites, for reasons relating to physics, the geostationary stations need to be vertically above the equator. Geostationary satellites remain invariably above the same point on the equator. As a result, the geostationary satellites always appear to be in the same position in the sky to an observer at a fixed point on the Earth's surface.

In order to communicate with a satellite of a satellite-based communication system of this kind, one of the satellites thereof must be targeted precisely. In the case of buildings, for example, this usually occurs only once when adjusting the antenna. However, if an aircraft/spacecraft uses satellite-based communication via a satellite-based communication system comprising geostationary satellites, the antenna in the aircraft/spacecraft must be readjusted during flight.

Since the satellites of a satellite-based communication system comprising satellites must be vertically above the equator in order to maintain their position relative to the Earth, communication with a satellite-based communication system of this kind is not possible at the polar ice caps. Since satellite-based communication systems comprising geostationary satellites are usually used for stationary applications, availability is likewise limited over the ocean.

Furthermore, communicating via a satellite-based communication system comprising geostationary satellites requires a greater amount of energy. Communication systems for communicating via a satellite-based communication system comprising geostationary satellites are therefore usually disconnected quickly in the event of a fault or problem.

Satellite-based communication systems comprising geostationary satellites have a high data transmission rate and can be used in a cost-effective manner for transmitting the aircraft/spacecraft data from the aircraft/spacecraft. The INMARSAT system can be cited as an example of a satellite-based communication system comprising geostationary satellites.

According to a development, the communication device may comprise a second antenna array, which is designed or configured to transmit data to a second satellite-based communication system comprising non-geostationary satellites. Furthermore, the control device may be designed or configured to output the aircraft/spacecraft data via the second satellite-based communication system during abnormal operation of the aircraft/spacecraft.

Abnormal operation of the aircraft/spacecraft is understood to mean any flight situation in which the aircraft/spacecraft is not in normal operation. For example, an emergency situation may arise during abnormal operation of the aircraft/spacecraft, making it harder or impossible to control the aircraft/spacecraft, or restricting the operation of the aircraft/spacecraft in another way.

In satellite-based communication systems comprising non-geostationary satellites, the satellites are in orbit around the Earth. In this case, the satellites move relative to the Earth. Communication via satellite-based communication systems of this kind comprising non-geostationary satellites does not take place using a single satellite that must be targeted in a precise manner. Instead, communication via satellite-based communication systems of this kind comprising non-geostationary satellites takes place using alternating satellites, which can be reached by the communication device at any given moment. Accordingly, the steps of, for example, guiding the antennas and targeting individual satellites are omitted.

In satellite-based communication systems comprising non-geostationary satellites, a plurality of antennas, for example, may be grouped into the individual participants, which antennas provide the footprint for individual "cells" or regions, or corresponding phased-array antennas having multi-lobe characteristics may be used. In this case, the regions or cells are adapted such that a sufficient number of satellites for a communication procedure can always be targeted.

The satellites may form a separate data-transmission network in a satellite-based communication system of this kind. Data received by a satellite can therefore be transmitted from satellite to satellite, for example, until one of the satellites transmits the data to an earth station.

Since the non-geostationary satellites are not in a fixed position relative to the Earth's surface, but rather orbit the Earth, the satellites can also fly over the polar ice caps and oceans, for example By a sufficiently dense network of satellites, permanent or quasi-permanent availability can be provided over the entire globe.

On account of the fundamentally different data transmission principles in comparison with the satellite-based communication systems comprising geostationary satellites, the satellite-based communication systems comprising non-geostationary satellites achieve lower data transmission rates. However, the antennas do not have to be directed towards the satellites. As a result, data transmission is also still possible if the current orientation or position of the aircraft/spacecraft is unknown or can no longer be detected, for example.

The IRIDIUM system can be cited as an example of a satellite-based communication system comprising non-geostationary satellites.

According to a development, the second antenna array may be implemented in conjunction with a third antenna array for an emergency position transmission system, it being possible to implement the control device in conjunction with a control device of an emergency position transmission system. "In conjunction with" should be understood to mean that the third antenna array may also be used as the second antenna array or that the second antenna array may be implemented in a housing together with the third antenna array.

The Cospas-Sarsat satellite system is conventionally used for emergency position transmission systems in modern aircraft/spacecraft, which satellite system is used merely to locate an aircraft/spacecraft. It is not possible to transmit data using the system.

However, an emergency position transmission system of this kind is provided in every aircraft/spacecraft. The emergency position transmission system is also called an Emergency Locator Transmitter or ELT. The infrastructure for communicating with the Cospas-Sarsat satellite system is therefore already available. Furthermore, the infrastructure may also be used to integrate communication via a satellite-based communication system comprising non-geostationary satellites, since no guidable antenna, for example, is required in either system.

Therefore, the communication system according to the present disclosure can be very easily integrated in a system already present in the aircraft/spacecraft, without it being necessary to provide additional hardware such as computers and wiring.

The functions of the control device may be provided, for example, in part as extensions of the ELT control device already present in the aircraft/spacecraft. The wiring to the antenna of the ELT system is therefore already present and the ELT antenna can either be directly used for the satellite-based communication system comprising non-geostationary satellites or the second antenna array can very easily be additionally integrated as a phased-array antenna on the ELT antenna. Therefore, at least the portion of the control device which is used to communicate with the second satellite-based communication system can be integrated in the already existing control device of the ELT system.

According to a development, the control device may be designed or configured to mark already transmitted aircraft/spacecraft data and to store the data in an emergency memory of the aircraft/spacecraft.

The emergency memory may for example be a flight data recorder which can additionally store the aircraft/spacecraft data as a redundant data memory. The emergency memory is therefore used as a redundant local memory in the aircraft/spacecraft, and can be recovered, for example as hitherto customary, following an aircraft/spacecraft accident. It is also possible for the aircraft/spacecraft data to be stored in the flight data memory independently of the control device.

According to a development, the control device may be designed or configured to retrieve the aircraft/spacecraft data from electrical and/or electronic systems and to store the data in the data memory ready for transmission, it being possible, in particular, for the control device to be designed or configured to compress and packetize the stored data.

The control device therefore controls both the data detection and the data transmission. The partitioning saves resources, since the control device already present in the aircraft/spacecraft can be used not only for data transmission but also for detection. Furthermore, it can be ensured that transmission of data based on current information relating to the quality of the satellite-based communication takes place. By compressing and packetizing the data, efficient data transmission can further be ensured. The size of the data packets may be determined depending on the timeliness requirements of the transmitted data.

Because the control device is being used for data transmission and for data detection or preparation, control commands can also be transmitted to the control device via satellite-based communication. Therefore, transmission of the data packet, for example, can be actively requested, or the size of the data packet to be transmitted can be set.

Furthermore, the control device can protect the transmitted data, for example. For this purpose, the control device can use error correction mechanisms, for example, and receive and evaluate checksums or the like from the receiver of the data, for example.

The above-mentioned embodiments and developments can be combined in any manner, if appropriate. Further possible embodiments, developments and implementations of the disclosure herein include combinations of features of the disclosure herein described previously or below with respect to the embodiments, even if not explicitly specified. In particular, a person skilled in the art will also add individual aspects as improvements or supplements to the particular basic form of the present disclosure.

BRIEF DESCRIPTION OF THE DRAWINGS

The present disclosure will be described in greater detail below with reference to the embodiments shown in the schematic drawings, in which.

The accompanying drawings are intended to facilitate further understanding of the embodiments of the disclosure herein. The drawings illustrate embodiments and, together with the description, serve to explain principles and concepts of the disclosure herein. Other embodiments and many of the advantages mentioned can be found with reference to the drawings. The elements of the drawings are not necessarily shown true to scale relative to one another.

In the figures of the drawings, the same elements, features and components are provided with the same reference signs in each case, unless otherwise specified.

DETAILED DESCRIPTION

Figure 1:
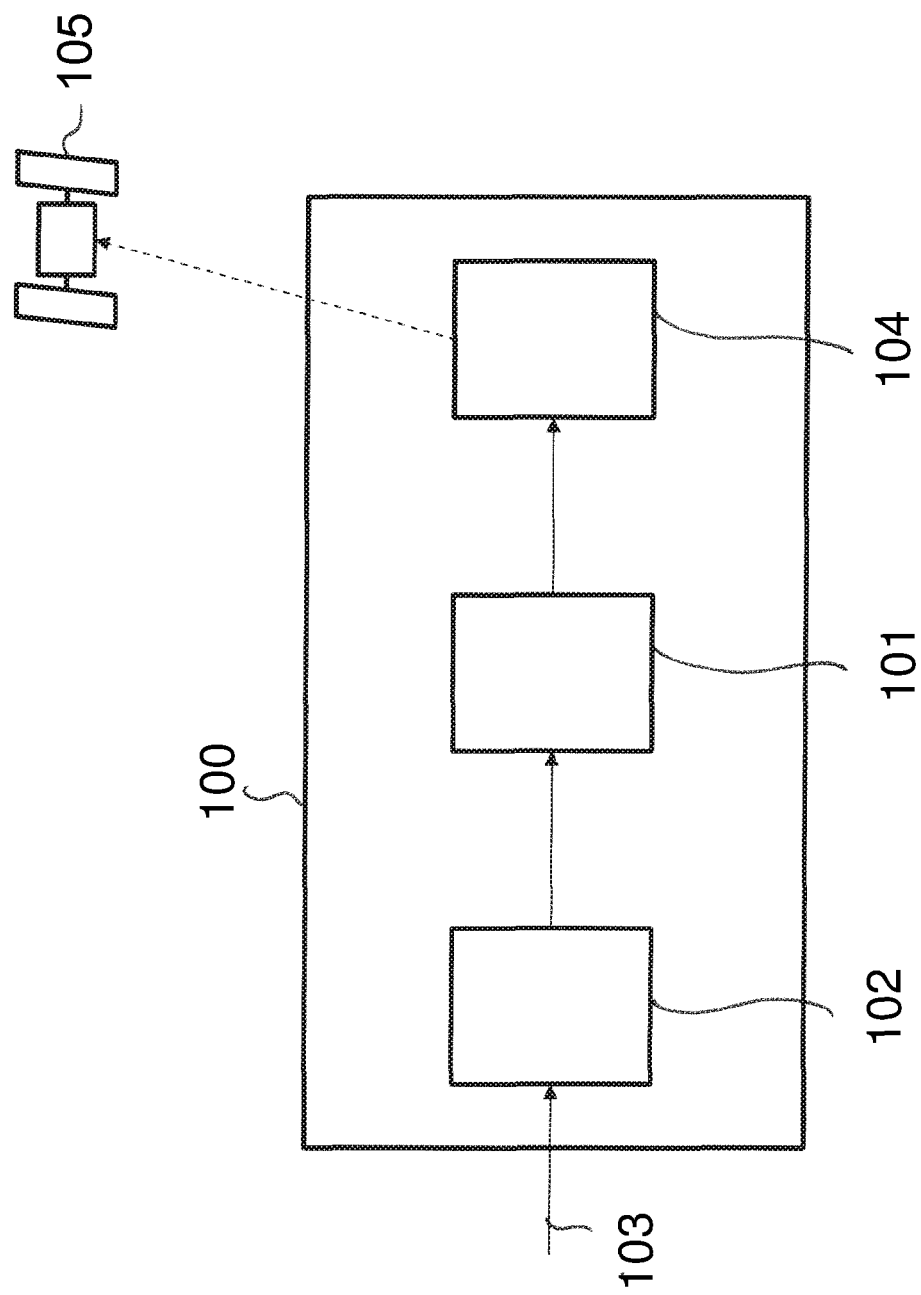
FIG. 1 is a block diagram of an embodiment of a communication system according to the disclosure herein.
Figure 3:
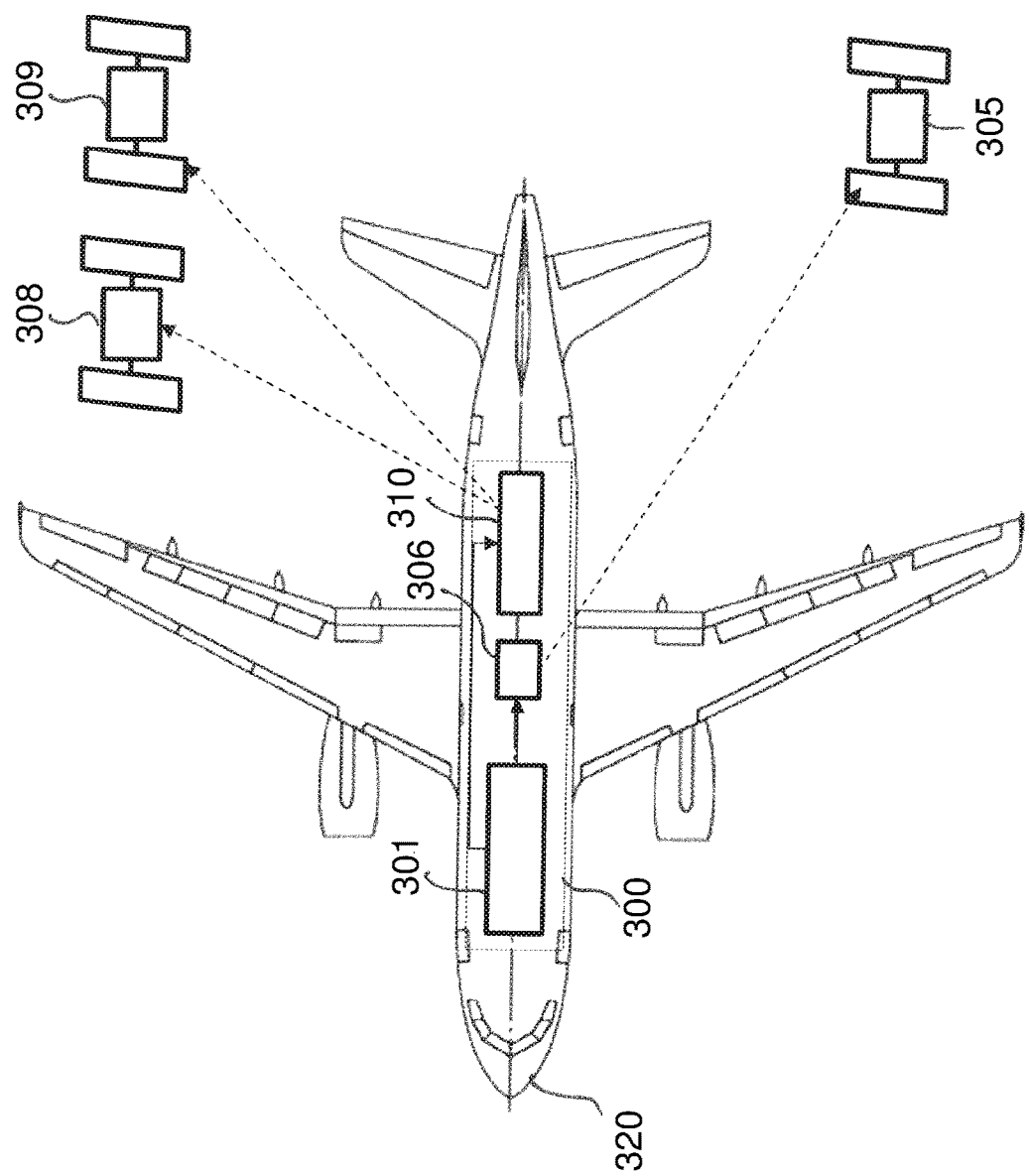
FIG. 3 is a block diagram of an embodiment of an aircraft/spacecraft according to the disclosure herein.

FIG. 1 is a block diagram of an embodiment of a communication system 100 according to the disclosure herein for satellite-based communication for an aircraft/spacecraft (see FIG. 3). The communication system 100 comprises a control device 101 which is coupled to the data memory 102 and to the communication device 104.

The data memory 102 stores aircraft/spacecraft data 103 during operation of the aircraft/spacecraft. The aircraft/spacecraft data 103 may for example be the data which are conventionally stored on a flight data recorder. Data of this kind may comprise, for example, flight data, such as the position and orientation of the aircraft/spacecraft, audio data from the cockpit or the cabin of the aircraft/spacecraft, image data from the cockpit or cabin of the aircraft/spacecraft, or the like. In one embodiment, the data memory 102 may also be a flight data recorder which stores the aircraft/spacecraft data 103 and can output the data via a data interface.

The communication device 104 is capable of communicating with at least one satellite-based communication system 105, i.e. of sending data thereto or receiving data therefrom.

The control device 101 can therefore read out the aircraft/spacecraft data 103 stored in the data memory 102 during operation of the aircraft/spacecraft and output the data via the satellite-based communication system 105, e.g. to a central management point (not shown separately), which evaluates the aircraft/spacecraft data 103 or simply stores the data in order to evaluate same when necessary.

Furthermore, the central management point of the control device 101 can also transmit control commands, for example, by which the transmission of the aircraft/spacecraft data 103 can be controlled. For example, aircraft/spacecraft data 103 can be explicitly requested, or the transmission of aircraft/spacecraft data 103 can be interrupted.

Using the communication system 100, the aircraft/spacecraft data 103 can therefore already be output during normal operation before and/or during an incident.

Figure 2:
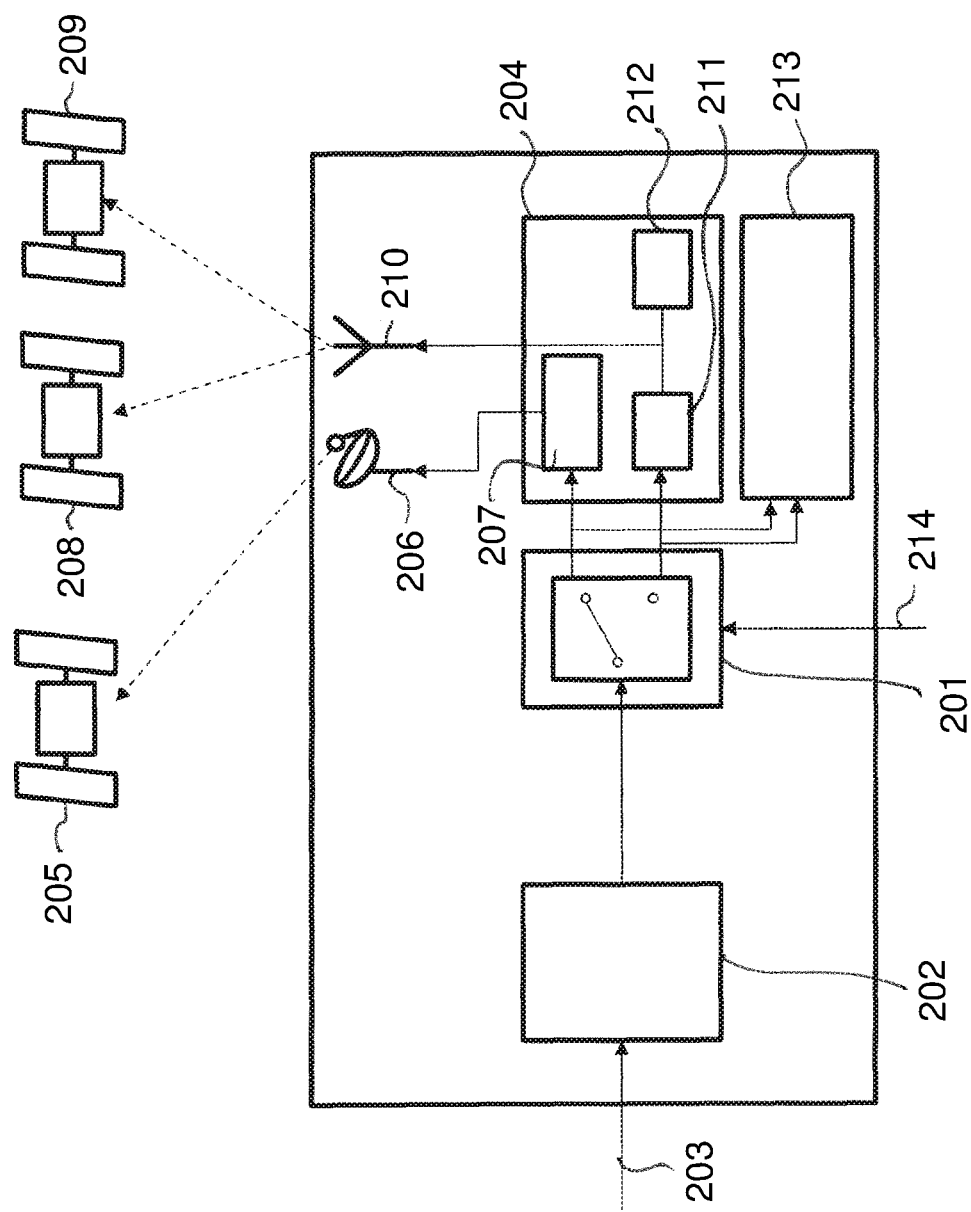
FIG. 2 is a block diagram of another embodiment of a communication system according to the disclosure herein.

FIG. 2 shows a block diagram of another communication system 200. The communication system 200 is based on the communication system 100 and comprises two antenna devices 206, 210.

The first antenna device 206 is designed or configured to communicate with a first satellite-based communication system 205. The first satellite-based communication system 205 comprises geostationary satellites. The first antenna array 206 must therefore be readjusted when the position of the aircraft/spacecraft changes so that the relevant satellite is still targeted. Communication via the first satellite-based communication system 205 consumes a greater amount of energy while simultaneously having a high data rate. The first satellite-based communication system may be an INMARSAT system, for example.

The second antenna device 210 is designed or configured to communicate with a second satellite-based communication system 208 and a third satellite-based communication system 209. In contrast with the first satellite-based communication system 205, the second and the third satellite-based communication systems 208, 209 comprise non-geostationary satellites. The second satellite-based communication system 208 may be the IRIDIUM or IRIDIUM NEXT system, for example. The third satellite-based communication system 209 may for example be the ELT system, which is used in emergency situations to determine or transmit a position.

In order to communicate with non-geostationary satellites, the antenna devices 206, 210 are designed or configured such that they cover a plurality of regions at the same time. In this case, the regions covered are adapted to the distribution of satellites of the relevant system. The second antenna array 210, which communicates with the second and third satellite-based communication system 208, 209, may be designed or configured such that it can reach both the satellites of the second and of the third satellite-based communication system 208, 209. Alternatively, the second antenna array 210 may even comprise two antennas.

The communication device 204 therefore comprises three different satellite modems 207, 211, 212. The first modem 207 is used to communicate via the first satellite-based communication system 205. The second modem 211 is used to communicate via the second satellite-based communication system 208. Finally, the third modem 212 is used to communicate via the third satellite-based communication system 209. In this case, the third modem 212 is not coupled to the control device 201, since the modem does not transmit any aircraft/spacecraft data 203.

Aside from the aircraft/spacecraft data 203, the control device 201 also obtains an emergency signal 214 from the data memory 203. The emergency signal 214 may be generated for example by aircraft/spacecraft systems that can recognize whether there is an emergency in the aircraft/spacecraft. The control device 201 may output the aircraft/spacecraft data 203 in normal flight situations, for example, i.e. not in an emergency, via the first satellite-based communication system 205. However, if there is an emergency, the control device 201 can switch over to the second satellite-based communication system 208. As a result, the energy consumption can be reduced, since communication with the second satellite-based communication system 208 is less energy-intensive. In addition, no readjustment of the antenna array 210 is necessary. Communication can therefore also be maintained if the position or orientation of the aircraft/spacecraft changes in an uncontrolled manner.

Finally, an emergency memory 213 is provided in the communication system 200. The control device 201 stores the already transmitted aircraft/spacecraft data 203, for example, in the emergency memory 213. The emergency memory 213 may be a flight data recorder, for example.

Alternatively, the control device 201 may also read out the aircraft/spacecraft data 203 from the emergency memory 213. The emergency memory 213, i.e. the flight data recorder, stores the aircraft/spacecraft data 203 autonomously, for example, i.e. without involvement of the control device 201. This corresponds to the function of a conventional flight data recorder. However, the emergency memory 213 may also be designed or configured to output the stored aircraft/spacecraft data 203 to the control device 201. The control device can then output the aircraft/spacecraft data 203 in a satellite-based manner.

FIG. 3 is a block diagram of an aircraft/spacecraft 320 comprising a communication system 300 according to the disclosure herein. The communication system 300 is shown merely schematically as a control device 301 comprising two antenna devices 306 and 310. The two antenna devices 306 and 310 communicate with the first satellite-based communication system 305, and the second satellite-based communication system 308 and third satellite-based communication system 310, respectively.

It is clear that each of the embodiments of a communication system according to the disclosure herein described with reference to FIGS. 1 and 2 can be used in the aircraft/spacecraft 320.

In this case, the control device can in particular be integrated in an ELT system, i.e. an Emergency Locator Transmitter, and the second antenna device 310 can be the antenna device of the ELT system.

Figure 4:
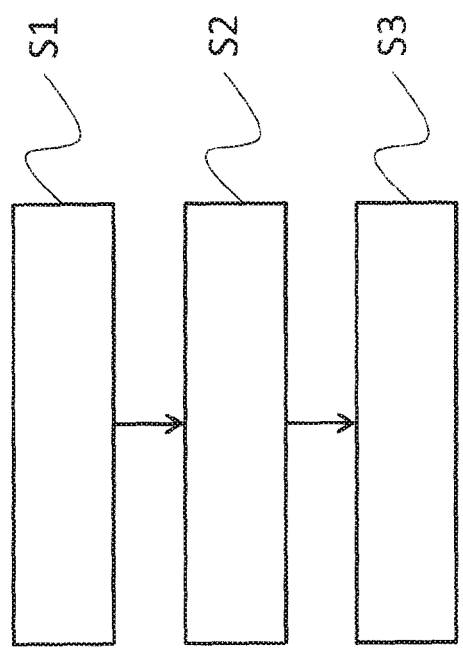
FIG. 4 is a flow chart of an embodiment of a method according to the disclosure herein.

FIG. 4 is a flow chart of an embodiment of a communication method according to the disclosure herein for satellite-based communication for an aircraft/spacecraft 320.

For the sake of clarity, the reference signs from FIGS. 1 to 3 are retained in the description of method-based FIG. 4.

The communication method comprises storing S1 aircraft/spacecraft data 103, 203 during operation of the aircraft/spacecraft 320. Furthermore, the communication method comprises communicating S2 with at least one satellite-based communication system 105, 205, 208, 209, 305, 308, 209. Finally, the stored aircraft/spacecraft data 103, 203 are output during operation of the aircraft/spacecraft 320 via communication with the at least one satellite-based communication system 105, 205, 208, 209, 305, 308, 209.

The aircraft/spacecraft data 103, 203 can be retrieved by electrical and/or electronic systems of the aircraft/spacecraft 320 and stored ready for transmission. For this purpose, the stored aircraft/spacecraft data 103, 203 may in particular be compressed and packetized. Already transmitted aircraft/spacecraft data 103, 203 can be marked and stored in an emergency memory 213 of the aircraft/spacecraft 320.

During communication, data can be transmitted via a first antenna array 206, 306 to a first satellite-based communication system 205, 305 comprising geostationary satellites, it being possible to output the aircraft/spacecraft data 103, 203 via the first satellite-based communication system 205, 305 during normal operation of the aircraft/spacecraft 320 and when data communication via the first satellite-based communication system 205, 305 is available.

However, during communication, data can also be transmitted via a second antenna array 210, 310 to a second satellite-based communication system 208, 308 comprising non-geostationary satellites, it being possible to output the aircraft/spacecraft data 103, 203 via the second satellite-based communication system 208, 308 during abnormal operation of the aircraft/spacecraft 320.

During communication via the second antenna array 210, 310, it is possible to communicate via a third antenna array for an emergency position transmission system. The second antenna array 210, 310 may therefore simultaneously be the antenna array of the emergency position transmission system. At the same time, the communication method can be controlled in a control device 101, 201, 301 of the emergency position transmission system. Therefore, no separate control device for the communication method is necessary.

An emergency power supply, as usually comprised in ELT systems or flight recorders, is not shown separately in the figures. However, it is clear that each embodiment of the present disclosure may also comprise an emergency power supply for the communication system.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A communication system for satellite-based communication for an aircraft/spacecraft, comprising:
   a data memory, which is configured to store aircraft/spacecraft data during operation of the aircraft/spacecraft;
   a communication device, which is configured to communicate with at least one satellite-based communication system; and
   a control device, which is coupled to the data memory and the communication device and is configured to output aircraft/spacecraft data stored in the data memory during operation of the aircraft/spacecraft via the communication device;
   wherein the communication device comprises a first antenna array which is configured to transmit data to a first satellite-based communication system comprising non-geostationary satellites; and
   wherein the control device is configured to output the aircraft/spacecraft data via the first satellite-based communication system during abnormal operation of the aircraft/spacecraft.

2. The communication system of claim 1, wherein the communication device comprises a second antenna array which is configured to transmit data to a second satellite-based communication system comprising geostationary satellites, and wherein the control device is configured to output the aircraft/spacecraft data via the second satellite-based communication system during normal operation of the aircraft/spacecraft and when data communication via the second satellite-based communication system is available.

3. The communication system of claim 1, wherein the first antenna array is implemented in conjunction with a third antenna array for an emergency position transmission system, and wherein the control device is implemented in conjunction with a control device of an emergency position transmission system.

4. The communication system of claim 1, wherein the control device is configured to mark already transmitted aircraft/spacecraft data and to store the data in an emergency memory of the aircraft/spacecraft.

5. The communication system of claim 1, wherein the control device is configured to retrieve the aircraft/spacecraft data from at least one of electrical and electronic systems of the aircraft/spacecraft and to store the data in the data memory ready for transmission.

6. The communication system of claim 5, wherein the control device is configured to compress and packetize the stored aircraft/spacecraft data.

7. An aircraft/spacecraft comprising a communication system, the communication system comprising:
   a data memory, which is configured to store aircraft/spacecraft data during operation of the aircraft/spacecraft;
   a communication device, which is configured to communicate with at least one satellite-based communication system; and
   a control device, which is coupled to the data memory and the communication device and is configured to output aircraft/spacecraft data stored in the data memory during operation of the aircraft/spacecraft via the communication device;
   wherein the communication device comprises an antenna array which is configured to transmit data to a satellite-based communication system comprising non-geostationary satellites; and
   wherein the control device is configured to output the aircraft/spacecraft data via the satellite-based communication system during abnormal operation of the aircraft/spacecraft.

8. A communication method for satellite-based communication for an aircraft/spacecraft, the communication method comprising:
   storing aircraft/spacecraft data during operation of the aircraft/spacecraft;
   communicating with at least one satellite-based communication system; and
   outputting the stored aircraft/spacecraft data during operation of the aircraft/spacecraft via communication with the at least one satellite-based communication system;
   wherein, during communication, data are transmitted via a first antenna array to a first satellite-based communication system comprising non-geostationary satellites; and
   wherein the aircraft/spacecraft data are output via the first satellite-based communication system during abnormal operation of the aircraft/spacecraft.

9. The communication method of claim 8, wherein, during communication, data are transmitted via a second antenna array to a second satellite-based communication system comprising geostationary satellites, and wherein the aircraft/spacecraft data are output via the second satellite-based communication system during normal operation of the aircraft/spacecraft and when data communication via the second satellite-based communication system is available.

10. The communication method of claim 8, wherein, during communication via the first antenna array, communication takes place via an antenna array for an emergency position transmission system, and wherein the communication method is controlled in a control device of the emergency position transmission system.

11. The communication method of claim 8, wherein already transmitted aircraft/spacecraft data is marked and stored in an emergency memory of the aircraft/spacecraft.

12. The communication method of claim 8, wherein the aircraft/spacecraft data are retrieved by at least one of electrical and electronic systems of the aircraft/spacecraft and stored ready for transmission, wherein the stored aircraft/spacecraft data are compressed and packetized.

* * * * *